(12) United States Patent
Huang

(10) Patent No.: US 11,938,400 B2
(45) Date of Patent: Mar. 26, 2024

(54) OBJECT CONTROL METHOD AND APPARATUS, STORAGE MEDIUM, AND ELECTRONIC APPARATUS

(71) Applicant: TENCENT TECHNOLOGY (SHENZHEN) COMPANY LIMITED, Guangdong (CN)

(72) Inventor: Xiongfei Huang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 420 days.

(21) Appl. No.: 17/320,051

(22) Filed: May 13, 2021

(65) Prior Publication Data
US 2021/0260478 A1 Aug. 26, 2021

Related U.S. Application Data

(63) Continuation of application No. PCT/CN2020/072635, filed on Jan. 17, 2020.

(30) Foreign Application Priority Data

Feb. 21, 2019 (CN) .......................... 201910130187.X

(51) Int. Cl.
*A63F 13/42* (2014.01)
*A63F 13/44* (2014.01)
(Continued)

(52) U.S. Cl.
CPC .............. *A63F 13/44* (2014.09); *A63F 13/42* (2014.09); *G06F 18/2431* (2023.01); *G06N 20/00* (2019.01)

(58) Field of Classification Search
CPC ........ A63F 13/22; A63F 13/42; A63F 13/422; A63F 13/44
See application file for complete search history.

(56) References Cited

U.S. PATENT DOCUMENTS 9,687,741 B1 * 6/2017 Kim .................... A63F 13/2145
10,449,451 B2 * 10/2019 Utsugi .................. A63F 13/573
(Continued)

FOREIGN PATENT DOCUMENTS

| CN | 108985367 A | 12/2018 |
|---|---|---|
| CN | 109806590 A | 5/2019 |
| JP | H07116353 A | 5/1995 |

OTHER PUBLICATIONS

International Search Report Issued in Application PCT/CN/2020/072635 dated Apr. 15, 2020, with English Translation (7 pages).
(Continued)

*Primary Examiner* — David L Lewis
*Assistant Examiner* — Robert E Mosser
(74) *Attorney, Agent, or Firm* — ARENTFOX SCHIFF LLP

(57) ABSTRACT

This disclosure includes an object control method and apparatus, a non-transitory computer-readable storage medium, and an electronic apparatus. In the method, long-press operations on a first virtual key and a second virtual key in an interaction interface are detected. The target object is controlled to perform the target action in a current path in response to the long-press operations. A target angle of the target object in a process of performing the target action is determined. Key responsiveness states of the first virtual key and the second virtual key are adjusted to invalid states when detecting that the long-press operations are performed on the first virtual key and the second virtual key, and the target angle reaches a first angle threshold matching the current path, to enable the target object to enter a state of passively performing the target action.

20 Claims, 7 Drawing Sheets

(51) Int. Cl.
*G06F 18/2431* (2023.01)
*G06N 20/00* (2019.01)

(56) References Cited

U.S. PATENT DOCUMENTS

| | | | | |
|---|---|---|---|---|
| 10,946,277 | B2* | 3/2021 | Liu | A63F 13/92 |
| 11,344,810 | B2* | 5/2022 | Huang | A63F 13/57 |
| 2020/0078668 | A1* | 3/2020 | Yabuki | G06F 3/04886 |
| 2020/0086214 | A1* | 3/2020 | Yabuki | A63F 13/803 |
| 2021/0245053 | A1* | 8/2021 | Weng | A63F 13/22 |

OTHER PUBLICATIONS

Written Opinion Issued in Application PCT/CN/2020/072635 dated Apr. 15, 2020 (5 pages).
Non-official translation: Shark Mother Mobile Games Video, "Non-official translation: QQ speed, advanced drift teaching, new fast drift CWW spray", Bilibili, Video 00:51-01:10, Apr. 17, 2018 (1 page).
Non-official translation: Game Frontline Information Analysis, "Non-official translation: QQ Speed Mobile Game: Speak from Data! All B Car Data You Want is Here!", Baidu, Feb. 26, 2018 (5 pages).
Chinese Office Action Issued in Application CN201910130187.X dated Dec. 31, 2019, with concise English Translation (17 pages).
Korean Office Action dated Mar. 10, 2023 in Application No. 10-2021-7013308, with English Translation (15 pages).
Fool's Wharf 314, [Little Master/Speed Car Teaching] + "QQ Speed Mobile Game" Super Drift Teaching Video 2560×1440, bilibili.com, https://www.bilibili.com/video/av20726519/, with English Translation, pp. 1-2.

* cited by examiner

OBJECT CONTROL METHOD AND APPARATUS, STORAGE MEDIUM, AND ELECTRONIC APPARATUS

RELATED APPLICATION

This application is a continuation of International Application No. PCT/CN2020/072635, entitled "OBJECT CONTROL METHOD AND APPARATUS, STORAGE MEDIUM AND ELECTRONIC APPARATUS" and filed on Jan. 17, 2020, which claims priority to Chinese Patent Application No. 201910130187.X, entitled "OBJECT CONTROL METHOD AND APPARATUS, STORAGE MEDIUM, AND ELECTRONIC APPARATUS" and filed on Feb. 21, 2019. The entire disclosures of the prior applications are hereby incorporated by reference in their entirety.

FIELD OF THE TECHNOLOGY

This disclosure relates to the field of computers, including an object control technology.

BACKGROUND OF THE DISCLOSURE

At present, in racing game applications, to enrich the user experience of a player, different racing tracks are often designed in a game scene, and the racing tracks include bends with different turning angles. To shorten the time in which a target object controlled by the player drives through a bend, the player often controls the target object through a control button that is set in a human-computer interaction interface to implement a drift action.

However, in the process of controlling, by the player, the foregoing target object to implement the drift action, the player usually needs to manually adjust a control operation on the control button according to game experience, to determine a drift angle of the target object in the drift process, so that the target object drifts according to the determined drift angle and then continues driving. In practical applications, if the player is unskilled in the control operation on the target object, drift errors are easily caused, which further affects a racing result.

In summary, the object control method provided in the related art imposes a relatively high operation requirement on the player, and consequently there is a problem of poor control accuracy in the process of controlling the object to drift.

For the foregoing problem, no effective solution has been provided.

SUMMARY

Embodiments of this disclosure provide an object control method and apparatus, a storage medium, and an electronic apparatus, to at least resolve the technical problem of poor control accuracy in a process of controlling an object to implement a target action.

According to an aspect of the embodiments of this disclosure, an object control method is provided. In the method, long-press operations on a first virtual key and a second virtual key in an interaction interface are detected, the first virtual key being configured to adjust a movement direction of a target object, the second virtual key being configured to trigger the target object to perform a target action. The target object is controlled to perform the target action in a current path in response to the long-press operations. A target angle of the target object in a process of performing the target action is determined, the target angle being an angle between the movement direction of the target object and a sliding direction of the target object. Key responsiveness states of the first virtual key and the second virtual key are adjusted to invalid states when detecting that the long-press operations are performed on the first virtual key and the second virtual key, and the target angle reaches a first angle threshold matching the current path, to enable the target object to enter a state of passively performing the target action. The invalid states indicate that key response logic of the first virtual key and the second virtual key are in suspended states.

According to another aspect of the embodiments of this disclosure, an object control apparatus is further provided. The apparatus can include processing circuitry configured to detect long-press operations on a first virtual key and a second virtual key in an interaction interface, the first virtual key being configured to adjust a movement direction of a target object, the second virtual key being configured to trigger the target object to perform a target action. The processing circuitry is configured to control the target object to perform the target action in a current path in response to the long-press operations. The processing circuitry is configured to determine a target angle of the target object in a process of performing the target action, the target angle being an angle between the movement direction of the target object and a sliding direction of the target object. Further, the processing circuitry is configured to adjust key responsiveness states of the first virtual key and the second virtual key to invalid states when detecting that the long-press operations are performed on the first virtual key and the second virtual key, and the target angle reaches a first angle threshold matching the current path, to enable the target object to enter a state of passively performing the target action. The invalid states indicate that key response logic of the first virtual key and the second virtual key are in suspended states.

According to still another aspect of the embodiments of this disclosure, a non-transitory computer-readable storage medium is further provided. The storage medium stores instructions which when executed by a processor cause the processor to perform the foregoing object control method.

According to yet another aspect of the embodiments of this disclosure, an electronic apparatus is further provided, including a memory, a processor, and a computer program stored in the memory and executable on the processor. The processor performs the foregoing object control method through the computer program.

According to yet another aspect of the embodiments of this disclosure, a computer program product is further provided, including instructions, the instructions, when run on a computer, causing the computer to perform the foregoing object control method.

In the embodiments of this disclosure, according to the object control method provided in the embodiments, in a process of running a client of a human-computer interaction application, after an operation instruction generated by performing a long-press operation on a first virtual key and a second virtual key in a human-computer interaction interface displayed on a client is obtained, the target object is controlled to perform the target action in a current path in response to the operation instruction, and a target angle generated by the target object in a process of performing the target action is detected. Then, key states of the first virtual key and the second virtual key are adjusted to an invalid state when detecting that the long-press operation is currently performed on the first virtual key and the second virtual key, and the target angle reaches a first angle threshold matching the current path. In other words, in the process of performing, by the target object controlled by the client, the target action in the current path, a relative relationship between the generated target angle and the first angle threshold is detected, to control the target object to automatically enter the state of passively performing the target action without relying on game experience of a player, so that the player does not need to manually adjust the control operation according to the game experience to determine the angle required for the target object to perform the target action, thereby reducing the operation difficulty for the player, improving the control accuracy when controlling the target object to perform the target action, and overcoming the problem of poor control accuracy caused since the player is unskilled in the control operation on the target object in the related art.

BRIEF DESCRIPTION OF THE DRAWINGS

The accompanying drawings described herein are used to provide a further understanding of this disclosure, and form part of this disclosure. Exemplary embodiments of this disclosure and descriptions thereof are used to explain this disclosure, and are not intended to limit the scope of this disclosure. In the accompanying drawings.

DESCRIPTION OF EMBODIMENTS

In order to make persons skilled in the art better understand the solutions of this disclosure, the following describes exemplary technical solutions in the embodiments of this disclosure with reference to the accompanying drawings in the embodiments of this disclosure. The described embodiments are only some of the embodiments of this disclosure rather than all of the embodiments. All other embodiments obtained by a person of ordinary skill in the art based on the embodiments of this disclosure shall fall within the protection scope of this disclosure.

In this specification, claims, and accompanying drawings of this disclosure, the terms "first", "second", and so on are intended to distinguish similar objects but do not necessarily indicate a specific order or sequence. It is to be understood that the data termed in such a way is interchangeable in proper circumstances, so that the embodiments of this disclosure described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
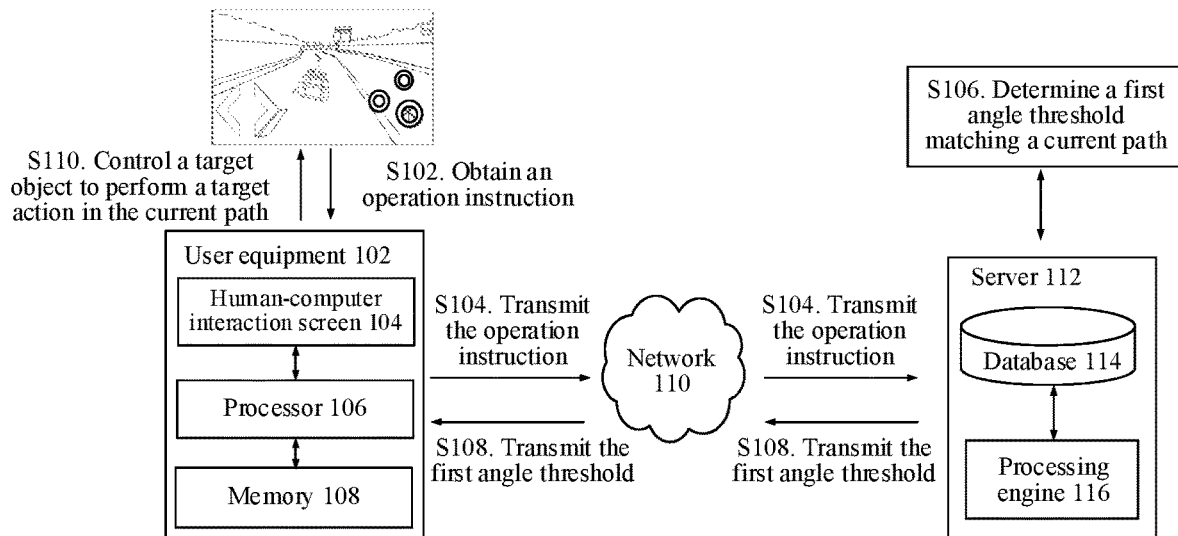
FIG. 1 is a schematic diagram of a hardware environment of an exemplary object control method according to an embodiment of this disclosure.

According to an aspect of the embodiments of this disclosure, an object control method is provided. In an exemplary implementation, the foregoing object control method may be applicable to, but is not limited to, a hardware environment shown in FIG. 1. It is assumed that a client, such as a racing game application client shown in FIG. 1, of a human-computer interaction application is installed in user equipment 102. During the running of the client, an operation instruction generated by performing a long-press operation on a first virtual key (e.g., as a direction key shown in the lower left corner of FIG. 1) and a second virtual key (e.g., as an action control key shown in the lower right corner of FIG. 1) in a human-computer interaction interface displayed by the client is obtained, as described in step S102.

The user equipment 102 includes a human-computer interaction screen 104, a processor 106, and a memory 108. The human-computer interaction screen 104 is configured to obtain a human-computer interaction operation. The processor 106 is configured to generate a corresponding operation instruction according to the human-computer interaction operation, and control a target object to perform a corresponding action in response to the operation instruction. The target object is a virtual object controlled by a user through the client, such as a racing car in a racing game application. The memory 108 is configured to store the foregoing operation instruction and attribute information related to the target object.

Then, the user equipment 102 may perform step S104 of transmitting the operation instruction to a server 112 through a network 110. The server 112 includes a database 114 and a processing engine 116. As described in step S106, the server 112 calls the processing engine 116, to determine, from the database 114, a first angle threshold matching a current path where the target object is located. Then, the server 112 performs step 5108 of transmitting the determined first angle threshold to the user equipment 102 through the network 110, so that the user equipment 102 uses the obtained first angle threshold to perform step S110 of controlling the target object to perform a target action in the current path.

Figure 2:
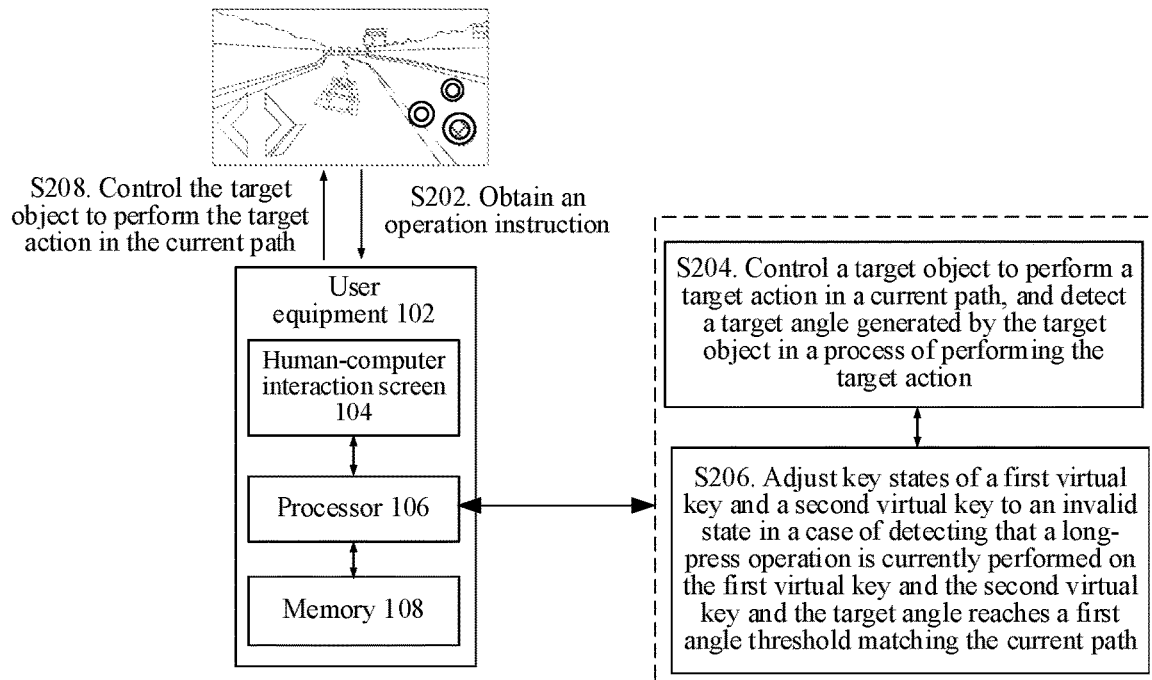
FIG. 2 is a schematic diagram of a hardware environment of another exemplary object control method according to an embodiment of this disclosure.

In addition, in an exemplary implementation, the foregoing object control method may alternatively be applicable to, but is not limited to, a hardware environment shown in FIG. 2. It is still assumed that a client, such as a racing game application client shown in FIG. 2, of a human-computer interaction application is installed in user equipment 102. During the running of the client, an operation instruction generated by performing a long-press operation on a first virtual key (e.g., a direction key shown in the lower left corner of FIG. 2) and a second virtual key (e.g., an action control key shown in the lower right corner of FIG. 2) in a human-computer interaction interface displayed by the client is obtained, as described in step S202.

Subsequent operations after the operation instruction is obtained may be applicable to, but are not limited to, an independent processing device with a relatively strong processing capability, without data exchange with the server 112. If the independent processing device is still the user equipment 102, the processor 106 in the user equipment 102 performs steps S204, S206, and S208 in response to the foregoing operation instruction: controlling the target object to perform the target action in a current path, and detecting a target angle generated by the target object in a process of performing the target action; and then, adjusting key states of the first virtual key and the second virtual key to an invalid state when detecting that the long-press operation is currently performed on the first virtual key and the second virtual key, and the target angle reaches a first angle threshold matching the current path, to enable the target object to enter a state of passively performing the target action. The foregoing first angle threshold may be, but is not limited to, pre-stored in the memory 108 of the user equipment 102. The foregoing is merely an example, and this is not limited in this embodiment.

According to the object control method provided in the embodiments, in a process of running a client of a human-computer interaction application, after an operation instruction generated by performing a long-press operation on a first virtual key and a second virtual key in a human-computer interaction interface displayed on a client is obtained, the target object controlled by the foregoing client is controlled to perform the target action in a current path in response to the operation instruction, and a target angle generated by the target object in a process of performing the target action is detected. Then, key states of the first virtual key and the second virtual key are adjusted to an invalid state when detecting that the long-press operation is currently performed on the first virtual key and the second virtual key, and the target angle reaches a first angle threshold matching the current path. In other words, in the process of performing, by the target object controlled by the client, the target action in the current path, a relative relationship between the generated target angle and the first angle threshold is detected, to control the target object to automatically enter the state of passively performing the target action without relying on game experience of a player, so that the player does not need to manually adjust the control operation according to the game experience to determine the angle required for the target object to perform the target action, thereby reducing the operation difficulty for the player, improving the control accuracy when performing the target action, and overcoming the problem of poor control accuracy caused since the player is unskilled in the control operation on the target object in the related art.

In an exemplary embodiment, the foregoing user equipment may be, but is not limited to, a terminal device that supports running of an application client such as a mobile phone, a tablet computer, a notebook computer, or a PC computer. The foregoing server and user equipment may, but are not limited to, implement data exchange through a network. The network may include, but is not limited to, a wireless network or a wired network. The wireless network can include: Bluetooth, Wi-Fi, and/or another network implementing wireless communication. The wired network may include, but is not limited to: a wide area network, a metropolitan area network, and/or a local area network. The foregoing is merely an example, and this is not limited in this embodiment.

Figure 3:
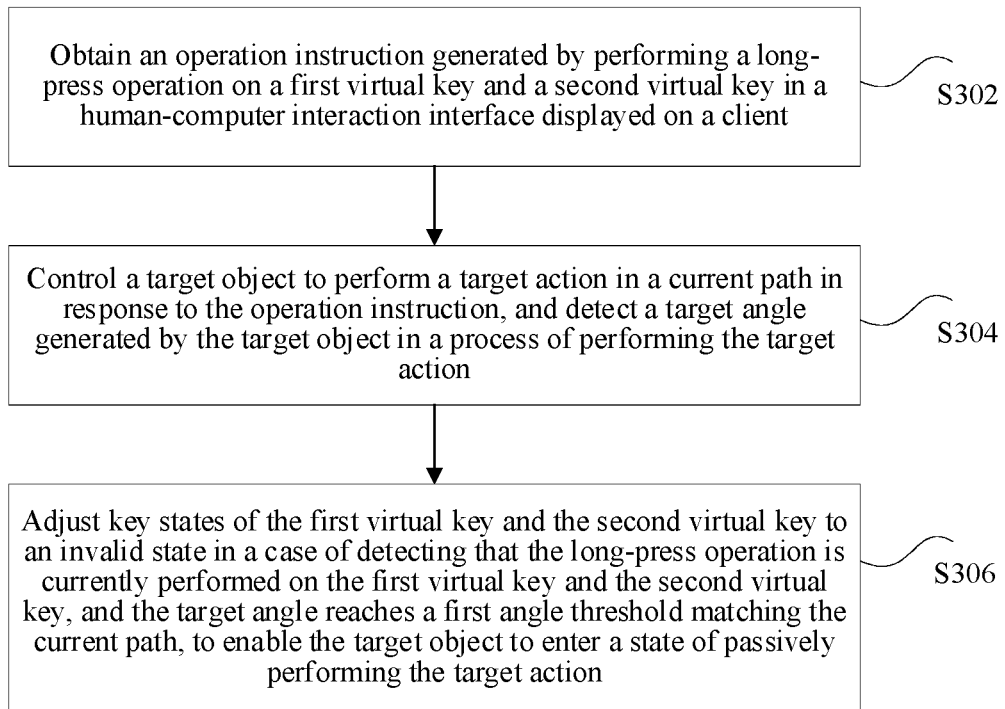
FIG. 3 is a flowchart of an exemplary object control method according to an embodiment of this disclosure.

In an exemplary implementation, as shown in FIG. 3, the foregoing object control method can include steps as follows.

In step S302, an operation instruction generated by performing a long-press operation on a first virtual key and a second virtual key in a human-computer interaction interface displayed on a client is obtained, the first virtual key being configured to adjust an advancing direction of a target object controlled by the client, the second virtual key being configured to trigger the target object to perform a target action. For example, long-press operations on a first virtual key and a second virtual key in an interaction interface can be detected, the first virtual key being configured to adjust a movement direction of a target object, the second virtual key being configured to trigger the target object to perform a target action.

In step S304, the target object is controlled to perform the target action in a current path in response to the operation instruction, and detect a target angle generated by the target object in a process of performing the target action, the target angle being an angle between the advancing direction of the target object and a sliding direction of the target object. For example, the target object can be controlled to perform the target action in a current path in response to the long-press operations. Further, a target angle of the target object in a process of performing the target action can be determined, the target angle being an angle between the movement direction of the target object and a sliding direction of the target object.

In step S306, key states of the first virtual key and the second virtual key are adjusted to an invalid state when detecting that the long-press operation is currently performed on the first virtual key and the second virtual key, and the target angle reaches a first angle threshold matching the current path, to enable the target object to enter a state of passively performing the target action, the invalid state being used for indicating that key response logic of the first virtual key and the second virtual key is in a suspended state. For example, key responsiveness states of the first virtual key and the second virtual key can be adjusted to invalid states when detecting that the long-press operations are performed on the first virtual key and the second virtual key, and the target angle reaches a first angle threshold matching the current path, to enable the target object to enter a state of passively performing the target action, the invalid states indicating that key response logic of the first virtual key and the second virtual key are in suspended states.

In an exemplary embodiment, the foregoing object control method may be applicable to, but is not limited to, a scenario in which an object controlled by a client of a human-computer interaction application is automatically controlled. For example, the human-computer interaction application may be, but is not limited to, a racing game application, and the target object may correspondingly be a virtual object manipulated in the racing game application, such as a virtual character, virtual equipment, or a virtual vehicle. The foregoing target action may be, but is not limited to, a drift action in a racing game scene, and a corresponding target angle may be, but is not limited to, a drift angle.

In other words, when the target object performs a drift action in the current path, through the solution provided in this embodiment, a target angle generated in a process of performing, by the target object, the drift action may be obtained in real time, the target angle is compared with the first angle threshold matching the current path, and when a comparison result indicates that the target angle reaches the first angle threshold, the key response logic of the first virtual key and the second virtual key in the human-computer interaction interface is adjusted to enter the suspended state (e.g., the invalid state), so that the target object automatically enters the state of passive drift. The foregoing is merely an example, and this is not limited in this embodiment.

In this embodiment, in the process of performing, by the target object controlled by the client, the target action in the current path, a relative relationship between the target angle generated by the target object and the first angle threshold is detected, to control the target object to automatically enter the state of passively performing the target action without relying on game experience of a player, so that the player does not need to manually adjust the control operation according to the game experience to determine the angle required for the target object to perform the target action, thereby reducing the operation difficulty for the player to improve the control accuracy when performing the target action.

In addition, in this embodiment, the target action performed by the foregoing target object in the current path may be, but is not limited to, a drift action in a racing scene. The foregoing drift action needs to be triggered and performed in a state of detecting that the long-press operation is performed simultaneously on the first virtual key and the second virtual key. The first virtual key may be, but is not limited to, a direction key configured to control the advancing direction of the target object, such as a "left direction key" and a "right direction key" shown in FIG. 4. The second virtual key may be, but is not limited to, a trigger control key configured to trigger the target object to perform the target action, such as a "drift start key" shown in FIG. 4.

Figure 4:
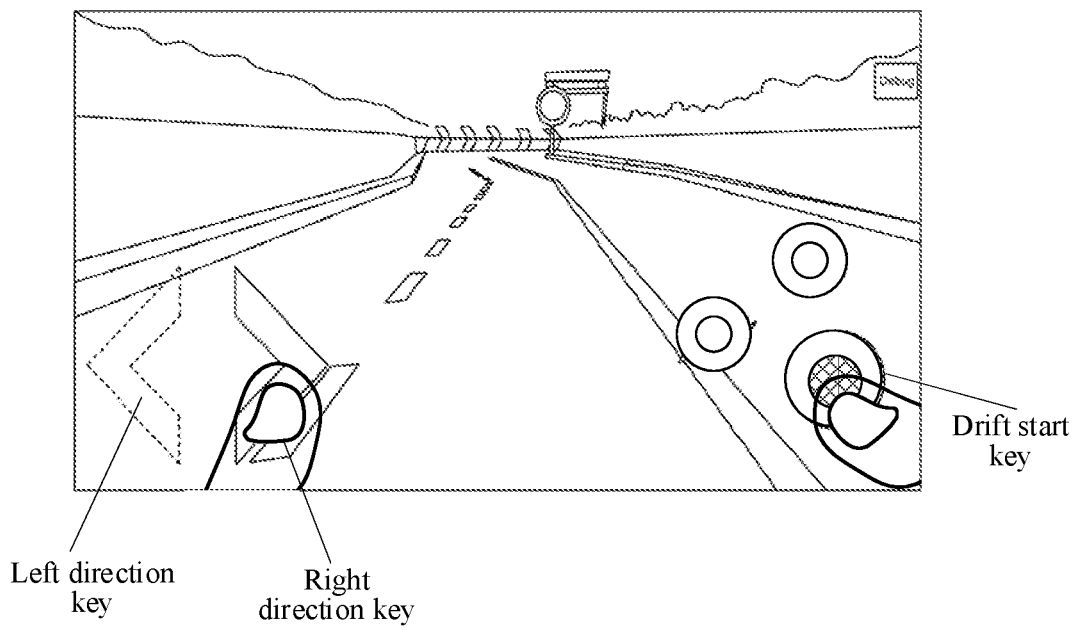
FIG. 4 is a schematic diagram of an exemplary object control method according to an embodiment of this disclosure.

Further, in this embodiment, when detecting that the user performs an operation on the foregoing virtual key, a display state of the corresponding virtual key indicates that the virtual key is in an "operation state". As shown in FIG. 4, when detecting that the user performs the long-press operation on the right direction key (e.g., the first virtual key), the corresponding virtual key is displayed as a "solid line"; and when detecting that the user performs the long-press operation on the drift start key (e.g., the second virtual key), the corresponding virtual key is displayed as "mesh filled". However, when detecting that the user does not perform an operation on the foregoing virtual key, a display state of the corresponding virtual key indicates that the virtual key is in a "no-operation state". As shown in FIG. 4, when detecting that the long-press operation is not performed on the left direction key, the corresponding virtual key is displayed as a "dashed line"; and when detecting that the long-press operation is not performed on the drift start key (e.g., the second virtual key), the corresponding virtual key may be modified as "unfilled" (not shown in FIG. 3).

In an exemplary embodiment, the key state of the foregoing virtual key may include, but is not limited to: a valid state and an invalid state. The invalid state is used for indicating that the key response logic of the virtual key is in a suspended state. In other words, when a press operation (e.g., a long-press operation) is performed on a virtual key in an invalid state, a back end does not execute key response logic of the virtual key. The valid state is used for indicating that the key response logic of the virtual key is normal. In other words, when a press operation (e.g., a long-press operation) is performed on a virtual key in a valid state, a back end executes key response logic of the virtual key.

Further, with reference to the foregoing description, in this embodiment, after the key state of the first virtual key and the second virtual key is adjusted to the invalid state, and the target object enters the state of passively performing the target action, the method may include, but is not limited to: causing, in the human-computer interaction interface, display states of the first virtual key and the second virtual key in the invalid state to be consistent with display states of the first virtual key and the second virtual key when the long-press operation is currently performed. In other words, when the target angle reaches the first angle threshold, the display states of the virtual keys are maintained, so that the user controls the target object to complete the target action in the current path without perception.

In an exemplary embodiment, the first angle threshold (also referred to as sensitivity below) may be determined by using, but is not limited to, a target classification model, the target classification model being obtained after machine training is performed by using sample data and being configured to determine an angle threshold matching path information of a path, the angle threshold being an angle at which a shortest duration is used for completing the target action in the path.

Further, in this embodiment, the first angle threshold determined by the target classification model may be further optimized and configured. A configuration manner may include, but is not limited to: performing a configuration operation on an angle threshold configuration item in the configuration interface of the client. In other words, for different user accounts that log in to the client, the angle threshold configuration item may be used to flexibly configure an angle threshold, to improve the flexibility of controlling the target object to perform the target action.

In an exemplary embodiment, the back end of the client may, but is not limited to, directly monitor a target angle of a controlled target object in real time, or may, but is not limited to, calculate the target angle of the target object after obtaining the advancing direction of the target object and the sliding direction of the target object.

For example, assuming that the target object is a virtual vehicle in a racing vehicle game application, the advancing direction of the target object may correspondingly be a vehicle head direction of the virtual vehicle, and the sliding direction of the target object may correspondingly be an actual sliding direction of a vehicle body of the virtual vehicle. Further, the two directions are used to determine a target angle generated by the virtual vehicle when performing a drift action.

In an exemplary embodiment, after the adjusting key states of the first virtual key and the second virtual key to an invalid state, the method further includes: determining, according to frictional resistance matching the current path after the target object enters the state of passively performing the target action, a remaining duration for the target object to complete the target action; and controlling the target object to complete the target action within the remaining duration.

Figure 5:
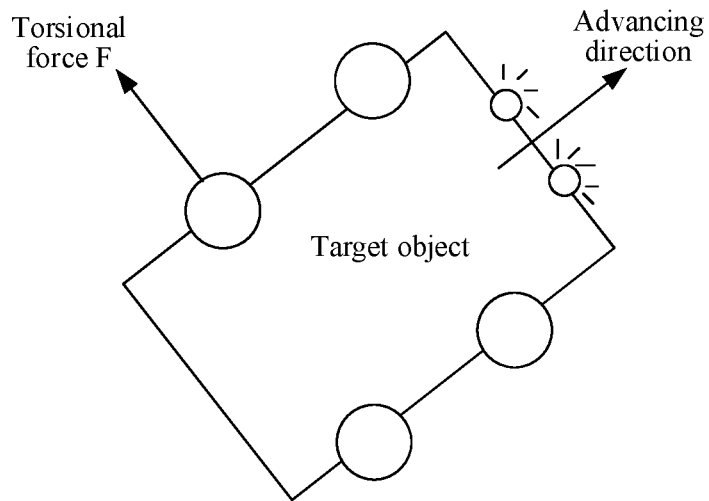
FIG. 5 is a schematic diagram of another exemplary object control method according to an embodiment of this disclosure.

In the process of long-pressing the first virtual key and the second virtual key simultaneously to generate the operation instruction, to control the target object to perform the target action, as shown in FIG. 5, a torsional force F is generated in a direction perpendicular to the advancing direction of the target object. The torsional force F is used to control the target object to maintain a fast steering state, so that the target angle is continuously increased, thereby performing a target action (such as a drift action, also referred to as "tail whipping action") in the current path. Further, when the target angle reaches the first angle threshold, after the key state of the first virtual key and the second virtual key is adjusted to the invalid state, the torsional force F disappears accordingly, and the target object enters the state of passively performing the target action (e.g., passive drift). As the frictional resistance of the current path affects the target object, the target object completes the target action in the process of passively performing the target action, that is, causing the target object to get out of the drift action and enter a normal driving state.

Figure 6:
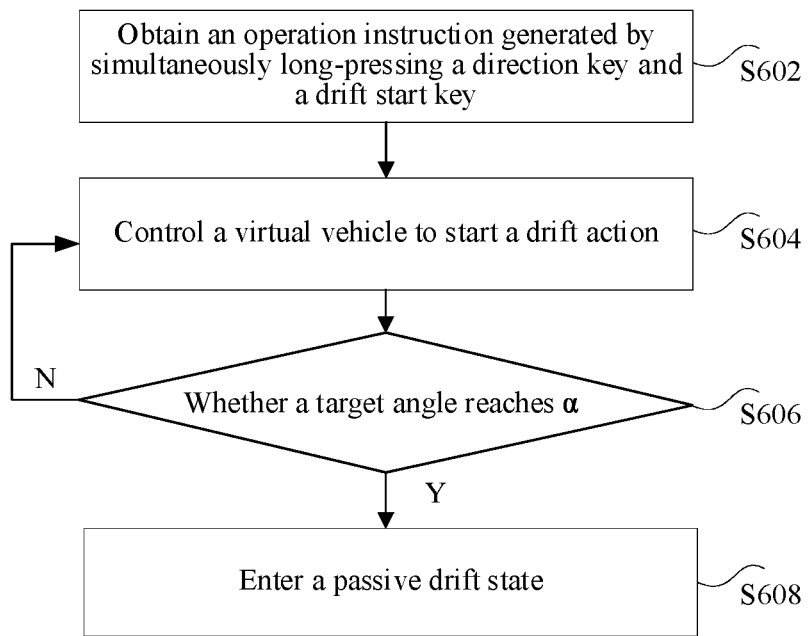
FIG. 6 is a flowchart of another exemplary object control method according to an embodiment of this application.

Specific descriptions are made with reference to steps S602, S604, S606, and S608 shown in FIG. 6. Assuming that a racing game application client is still used as an example for description, the target object is a virtual vehicle participating in racing and controlled by the client, and the target action is a drift action. The first virtual key is a direction key, and the second virtual key is a drift start key.

In step S602, the client obtains an operation instruction generated by simultaneously long-pressing the direction key (assuming that the right direction key is long-pressed) and the drift start key. In response to the operation instruction, the client performs step S604 of controlling the corresponding virtual vehicle to start performing the drift action in the current path. In the process of performing the drift action, a target angle of the virtual vehicle continues to increase. In step S606, it is detected whether the generated target angle reaches a first angle threshold $\alpha$. When detecting that the target angle has not reached the first angle threshold $\alpha$, return to step S604, to maintain a steering force to continue steering drift; and when detecting that the target angle reaches the first angle threshold $\alpha$, perform step S608 of controlling the virtual vehicle to enter a passive drift state.

Figure 7:
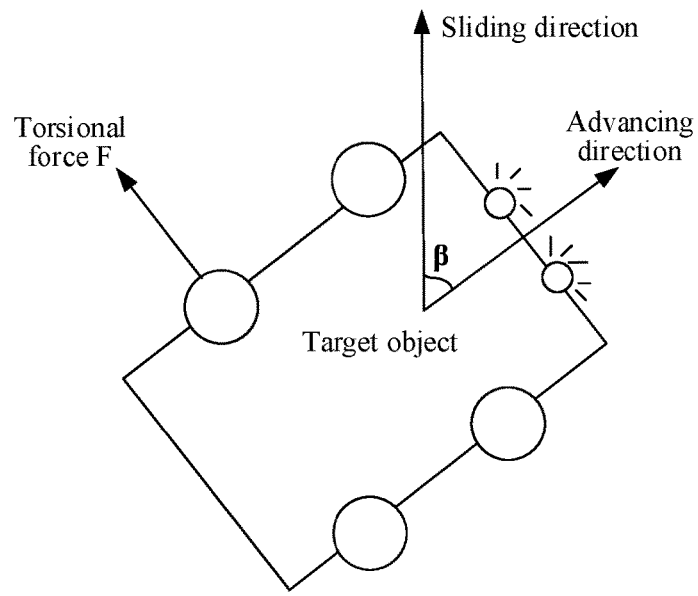
FIG. 7 is a schematic diagram of still another exemplary object control method according to an embodiment of this disclosure.

A target angle $\beta$ generated by the virtual vehicle in the process of performing the drift action may be shown in FIG. 7, which is an angle between the advancing direction (e.g., the vehicle head direction) of the virtual vehicle and the sliding direction (e.g., a vector direction of an actual speed of the vehicle body) of the virtual vehicle. The foregoing is merely an example, and this is not limited in this embodiment.

According to the embodiments provided in this disclosure, in the process of performing, by the target object controlled by the client, the target action in the current path, a relative relationship between the target angle generated by the target object and the first angle threshold is detected, to control the target object to automatically enter the state of passively performing the target action without relying on game experience of a player, so that the player does not need to manually adjust the control operation according to the game experience to determine the angle required for the target object to perform the target action, thereby reducing the operation difficulty for the player, improving the control accuracy when performing the target action, and overcoming the problem of poor control accuracy caused since the player is unskilled in the control operation on the target object in the related art.

In an exemplary solution, when adjusting key states of the first virtual key and the second virtual key to an invalid state, the method further includes controlling, in the human-computer interaction interface, display states of the first virtual key and the second virtual key in the invalid state to be consistent with display states of the first virtual key and the second virtual key when the long-press operation is performed on the first virtual key and the second virtual key.

In this embodiment, the display state of the virtual key may be, but is not limited to, presented through UI representation of the virtual key in the human-computer interaction interface. When an operation is currently performed on the virtual key, a display state of the corresponding virtual key is an "operation state", and when no operation is performed on the virtual key, a display state of the corresponding virtual key is a "no-operation state".

Figure 8:
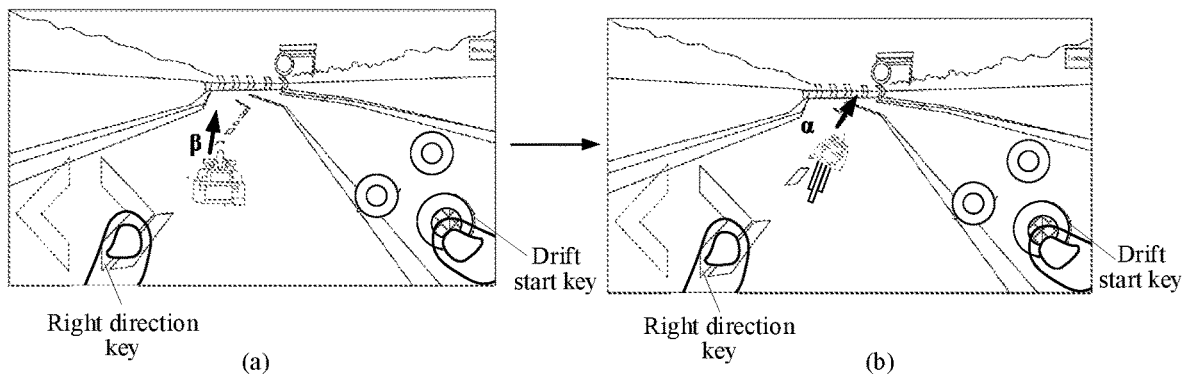
FIG. 8 is a schematic diagram of still another exemplary object control method according to an embodiment of this disclosure.

Specific descriptions are made with reference to an interface shown in FIG. 8. As shown in FIG. 8, it is assumed that a racing game application client is still used as an example for description. The first virtual key may be, but is not limited to, direction keys shown in the lower left corner of FIG. 8, including a "left direction key" and a "right direction key". The second virtual key may be, but is not limited to, a "drift start key" shown in the lower right corner of FIG. 8. When detecting that a left thumb and a right thumb perform the long-press operation on the "right direction key" and the "drift start key" respectively, a display state of the "right direction key" is an "operation state", displayed as a "solid line" shown in FIG. 8; and when detecting that no operation is performed by the user on the "left direction key", a display state of the "left direction key" is a "no-operation state", displayed as a "dashed line" shown in FIG. 8. The display state of the "drift start key" is the "operation state", displayed as "mesh filled" shown in FIG. 8.

Further, as shown in FIG. 8(a), a target angle $\beta$ generated by the virtual vehicle in the process of performing the drift action is detected. With the interaction between the torsional force F and the frictional resistance f generated in the process of performing the drift action, the target angle $\beta$ continues to increase. When detecting that the target angle $\beta$ generated by the virtual vehicle in the process of performing the drift action reaches the first angle threshold $\alpha$, the key states of the "right direction key" and the "drift start key" are adjusted to the invalid state, so that the virtual vehicle enters the state of passive drift. In the foregoing case, a human-computer interaction interface is shown in FIG. 8(b), and display states of the "right direction key" and the "drift start key" are still displayed as the "operation state" corresponding to the long-press operation, for example, the "right direction key" is displayed as the "solid line", and the "drift start key" is displayed as "mesh filled". In other words, when the key states of the "right direction key" and the "drift start key" are adjusted to the invalid state, the display states of the "right direction key" and the "drift start key" continue to remain unchanged.

According to the embodiments provided in this disclosure, when the target angle reaches the first angle threshold, the display states of the first virtual key and the second virtual key in the invalid state are controlled to be consistent with the display states of the virtual keys when the long-press operation is performed on the virtual keys, so that the user controls the target object to complete the target action in the current path without perception. Therefore, the user completes the target action in the current path automatically according to the first angle threshold without perception, which reduces the operation difficulty of user operations and avoids a problem of errors caused due to being unskilled in the operations.

In an exemplary solution, before the obtaining an operation instruction generated by performing a long-press operation on a first virtual key and a second virtual key in a human-computer interaction interface displayed on a client, the method can further include steps as follows.

In a first step, path information of the current path is input into a target classification model, the target classification model being a model obtained after machine training is performed by using sample data and being configured to determine an angle threshold matching path information of a path, the angle threshold being an angle at which a shortest duration is used for completing the target action in the path; and In a second step, the first angle threshold matching the current path is determined according to an output result of the target classification model.

In this embodiment, the target classification model may be configured to, but is not limited to, classify driving difficulty of the current path according to the path information of the current path, determine the first angle threshold matching the current path according to a classification result, and output the first angle threshold as an output result. The first angle threshold may alternatively be used for, but is not limited to, indicating the sensitivity of the player controlling the target object to pass through the current path.

Figure 9:
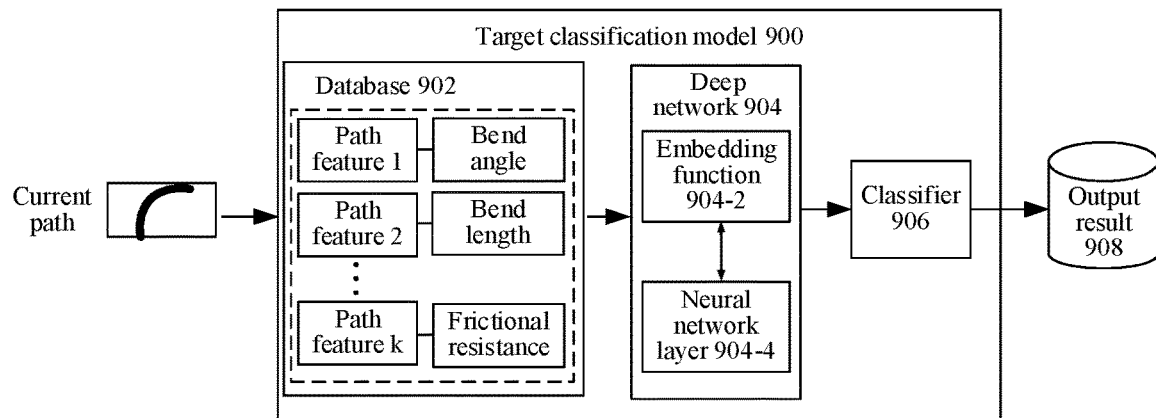
FIG. 9 is a schematic diagram of a target classification model in an exemplary object control method according to an embodiment of this disclosure.

The target classification model may be shown in FIG. 9. The classifying driving difficulty of the current path according to the path information of the current path may include, but is not limited to: extracting path features (e.g., path features 1 to k shown in FIG. 9) of the current path through a target classification model 900, where the path features may include, but are not limited to: a bend angle, a bend length, frictional resistance, and the like. The path features are stored into a database 902. Then, deep learning is performed on the path features of the current path in the database 902 through an embedding function 904-2 and a neural network layer 904-4 in a deep network 904, and a classification level of the driving difficulty of the current path is determined by a classifier 906. Further, an angle threshold adapted to the classification level is obtained as a first angle threshold matching the current path, and an output result 908 is obtained. The first angle threshold is an angle at which a shortest duration is used for performing the target action in the path corresponding to the classification level.

In an exemplary embodiment, before the inputting path information of the current path into a target classification model, the method further includes: obtaining the sample data generated when performing the target action in N sample paths, the sample data including an angle used when performing the target action in an $i^{th}$ sample path and a duration used for completing the target action, i being an integer greater than or equal to 1 and less than or equal to N; and inputting the sample data into a pre-constructed initial classification model, and adjusting a parameter in the initial classification model according to an output result of the initial classification model, to obtain the target classification model through training.

Figure 10:
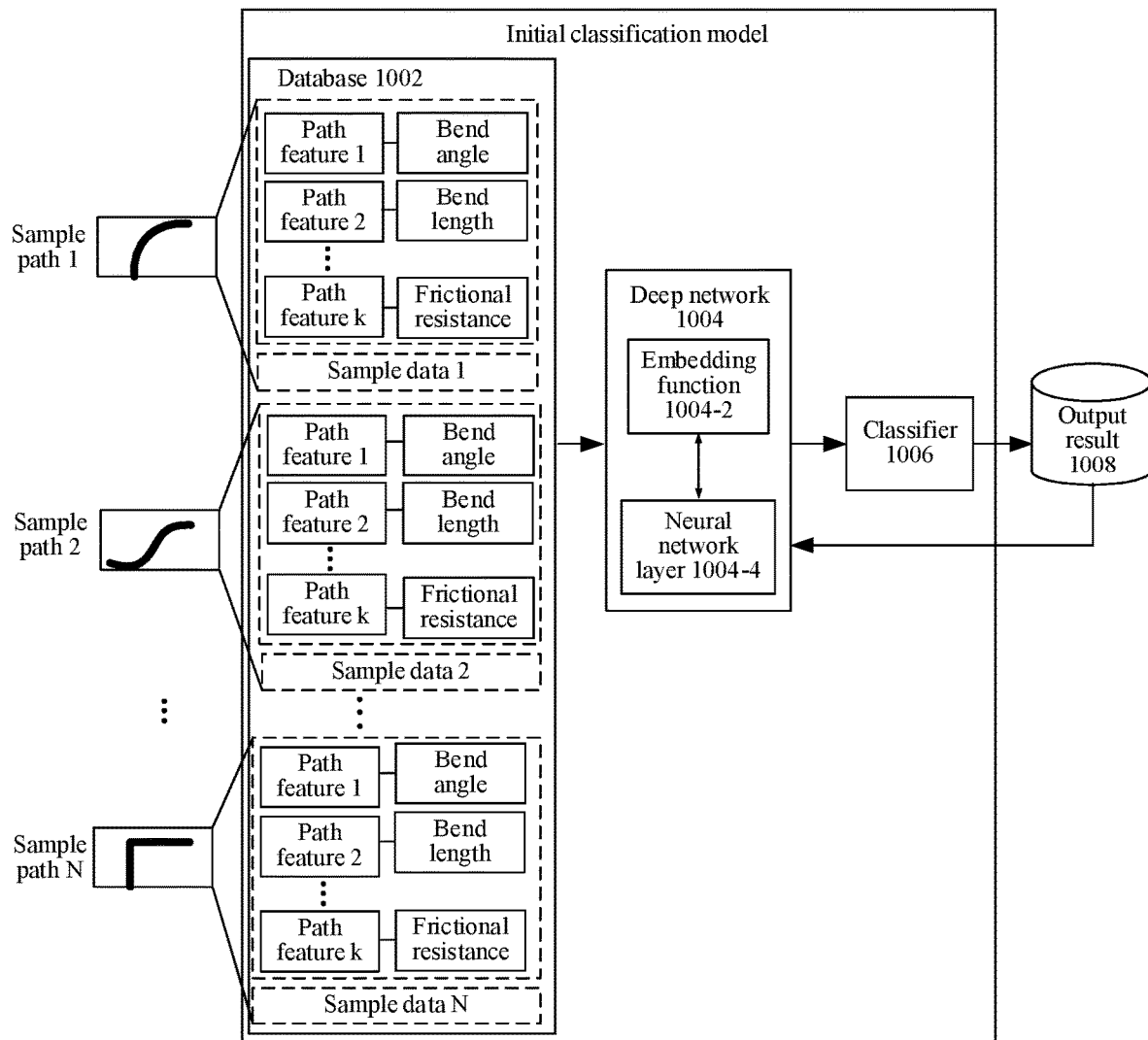
FIG. 10 is a schematic diagram of an initial classification model in another exemplary object control method according to an embodiment of this disclosure.

Specifically, description is provided with reference to the example shown in FIG. 10. The initial classification model is pre-constructed. It is assumed that the sample data generated when performing the target action in N sample paths is obtained, where the sample data may include, but is not limited to: an angle used when performing the target action in each sample path and a duration used for completing the target action. The angle may include, but is not limited to, [$angle_{min}$, $angle_{max}$] when performing the target action in a sample path and a corresponding used duration. Further, path features of the sample path, such as a bend angle, a bend length, and frictional resistance, are obtained.

Further, deep learning is performed on the path features and sample data of the N sample paths. A sample path 1 is used as an example, path features (e.g., path features 1 to k shown in FIG. 10) of the sample path 1 and corresponding sample data 1 are obtained and stored into a database 1002, and the path features 1 to k and the sample data 1 are inputted into a deep network 1004. Deep learning is performed on the path features and the sample data 1 of the sample path 1 through an embedding function 1004-2 and a neural network layer 1004-4 in the deep network 1004, and an output result 1008 is obtained through a classifier 1006. Feedback of the output result 1008 is used to adjust and optimize a parameter in the deep network 1004 in the initial classification model, to obtain a target classification model with a convergent result through training, making it convenient to use the target classification model to determine an optimal angle threshold when performing the target action in each path.

According to the embodiments provided in this disclosure, the path information of the current path is inputted into the target classification model, making it convenient to use the target classification model to determine an optimal angle threshold when performing the target action in the current path. Therefore, the duration for the target object to perform the target action in the current path can be shortened, and the accuracy of controlling the target object to perform the target action can be improved.

In an exemplary solution, after the determining the first angle threshold matching the current path according to an output result of the target classification model, the method can further include steps as follows.

In a first step, a configuration instruction generated by performing a configuration operation on an angle threshold configuration item in a configuration interface of the client is obtained.

In a second step, the first angle threshold is adjusted in response to the configuration instruction, to obtain the adjusted first angle threshold.

Figure 11:
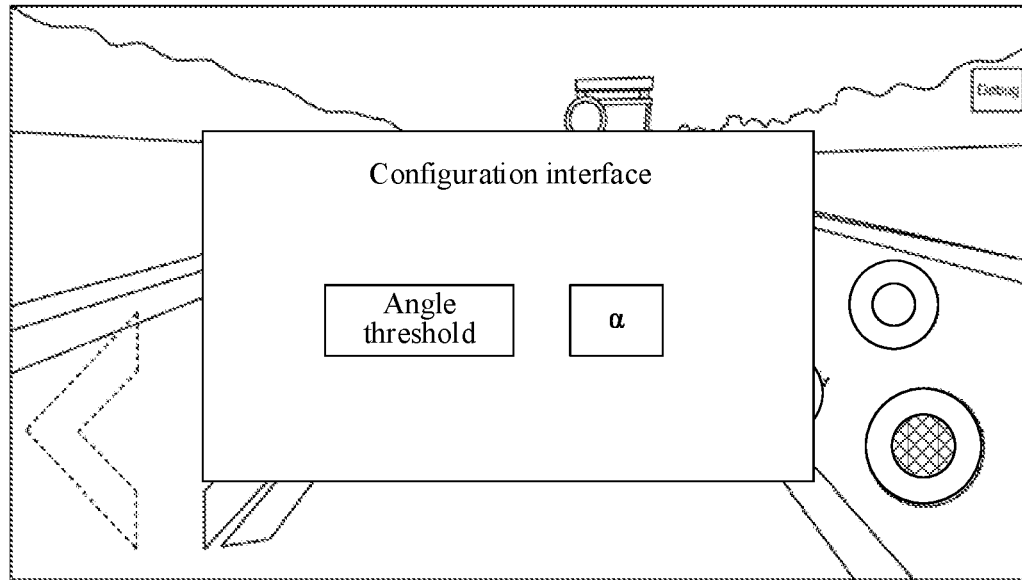
FIG. 11 is a schematic diagram of a configuration interface of an exemplary object control method according to an embodiment of this disclosure.

Specific descriptions are made with reference to FIG. 11, and the manner of determining the first angle threshold provided in the foregoing embodiment is still used as an example. After determining the first angle threshold based on the target classification model, the method may alternatively include, but is not limited to: displaying a configuration interface in a human-computer interaction interface, where the configuration interface may include an angle threshold configuration item, such as an "angle threshold" shown in FIG. 11. Further, a configuration instruction generated by performing a configuration operation on a parameter value α of the angle threshold configuration item is obtained, to perform configuration and optimization on the first angle threshold determined by the target classification model.

According to the embodiments provided in this disclosure, after the first angle threshold matching the current path is determined according to an output result of the target classification model, a configuration instruction generated by performing a configuration operation on an angle threshold configuration item in a configuration interface is obtained. The first angle threshold is further optimized and adjusted according to the configuration instruction, so that the adjusted first angle threshold is adapted to operating habits of the player. Therefore, it is convenient for different players to flexibly adjust different first angle thresholds, thereby improving the flexibility of object control.

In an exemplary solution, after the adjusting key states of the first virtual key and the second virtual key to an invalid state, the method can further include steps as follows.

(1) controlling the key state of the first virtual key to be the invalid state when detecting that the long-press operation is currently performed on the first virtual key and no press operation is currently performed on the second virtual key; or (2) controlling the key state of the second virtual key to return to a valid state when detecting that no press operation is currently performed on the first virtual key and the long-press operation is currently performed on the second virtual key, the valid state being used for indicating that the key response logic of the second virtual key returns to normal; or (3) controlling the key states of the first virtual key and the second virtual key to return to a valid state when detecting that no press operation is currently performed on the first virtual key and the second virtual key, the valid state being used for indicating that the key response logic of the first virtual key and the second virtual key returns to normal.

In this embodiment, after adjusting the key state of the first virtual key and the second virtual key to the invalid state, to restore the key response logic of the first virtual key and the second virtual key, the method may include, but is not limited to: releasing pressing on the two keys, that is, the press operation is not performed on the first virtual key and the second virtual key.

In addition, when detecting that the user still performs the long-press operation on the first virtual key but releases the pressing on the second virtual key (e.g., the press operation is not performed), the key state of the first virtual key is controlled to be the invalid state, so that the user can complete the target action in a relatively short time without perception. When detecting that the user releases the pressing on the first virtual key (e.g., the press operation is not performed) but still performs the long-press operation on the second virtual key, the key response logic of the second virtual key is restored, so that the second virtual key can be restarted quickly in response to the user operation, which shortens a start duration for performing the target action next time.

According to the embodiments provided in this disclosure, after adjusting the key state of the first virtual key and the second virtual key to the invalid state, the virtual keys are controlled to execute different operation logic according to different operation manners (e.g., pressing or lifting) of the user on the virtual keys, to expand key operation functions.

For ease of description, the foregoing method embodiments are stated as a series of action combinations. However, a person skilled in the art should understand that this disclosure is not limited to the described sequence of the actions because according to this disclosure, some steps may use another sequence or may be simultaneously performed. In addition, a person skilled in the art is further to understand that the embodiments described in this specification are exemplary, and the involved actions and modules are not necessarily required by this disclosure.

Figure 12:
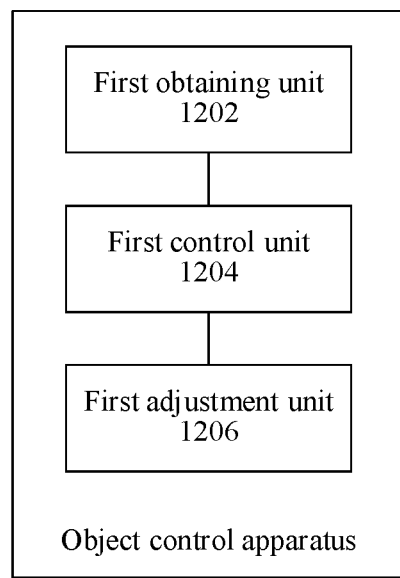
FIG. 12 is a schematic structural diagram of an exemplary object control apparatus according to an embodiment of this disclosure.

According to another aspect of the embodiments of this disclosure, an object control apparatus for implementing the foregoing object control method is further provided. As shown in FIG. 12, the apparatus can include various units. One or more of the units can be implemented by processing circuitry, software, or a combination thereof, for example.

A first obtaining unit 1202 is configured to obtain an operation instruction generated by performing a long-press operation on a first virtual key and a second virtual key in a human-computer interaction interface displayed on a client, the first virtual key being configured to adjust an advancing direction of a target object controlled by the client, the second virtual key being configured to trigger the target object to perform a target action.

A first control unit 1204 is configured to control the target object to perform the target action in a current path in response to the operation instruction, and detect a target angle generated by the target object in a process of performing the target action, the target angle being an angle between the advancing direction of the target object and a sliding direction of the target object.

A first adjustment unit 1206 is configured to adjust key states of the first virtual key and the second virtual key to an invalid state when detecting that the long-press operation is currently performed on the first virtual key and the second virtual key, and the target angle reaches a first angle threshold matching the current path, to enable the target object to enter a state of passively performing the target action, the invalid state being used for indicating that key response logic of the first virtual key and the second virtual key is in a suspended state.

In an exemplary solution, the apparatus can further include a display unit, configured to control, in the human-computer interaction interface when adjusting key states of the first virtual key and the second virtual key to an invalid state, display states of the first virtual key and the second virtual key in the invalid state to be consistent with display states of the first virtual key and the second virtual key when the long-press operation is performed on the first virtual key and the second virtual key.

According to the embodiments provided in this disclosure, when the target angle reaches the first angle threshold, the display states of the first virtual key and the second virtual key in the invalid state are controlled to be consistent with display states of key identifiers of the virtual keys when the long-press operation is performed on the virtual keys, so that the user controls the target object to complete the target action in the current path without perception. Therefore, the user completes the target action in the current path automatically according to the first angle threshold without perception, which reduces the operation difficulty of user operations and avoids a problem of errors caused due to being unskilled in the operations.

In an exemplary solution, the apparatus can further includes an input unit and a determining unit.

The input unit is configured to input path information of the current path into a target classification model before the obtaining an operation instruction generated by performing a long-press operation on a first virtual key and a second virtual key in a human-computer interaction interface displayed on a client, the target classification model being a model obtained after machine training is performed by using sample data and being configured to determine an angle threshold matching path information of a path, the angle threshold being an angle at which a shortest duration is used for completing the target action in the path.

The determining unit is configured to determine the first angle threshold matching the current path according to an output result of the target classification model.

In an exemplary embodiment, the apparatus can further include a second obtaining unit and a training unit.

The second obtaining unit is configured to obtain the sample data generated when performing the target action in N sample paths before the inputting path information of the current path into a target classification model, the sample data comprising an angle used when performing the target action in an $i^{th}$ sample path and a duration used for completing the target action, i being an integer greater than or equal to 1 and less than or equal to N.

The training unit is configured to input the sample data into a pre-constructed initial classification model, and adjust a parameter in the initial classification model according to an output result of the initial classification model, to obtain the target classification model through training.

According to the embodiments provided in this disclosure, the path information of the current path is inputted into the target classification model, making it convenient to use the target classification model to determine an optimal angle threshold when performing the target action in the current path. Therefore, the duration for the target object to perform the target action in the current path can be shortened, and the accuracy of controlling the target object to perform the target action can be improved.

In an exemplary solution, the apparatus can further include a third obtaining unit and a second adjustment unit.

The third obtaining unit is configured to obtain a configuration instruction generated by performing a configuration operation on an angle threshold configuration item in a configuration interface of the client after the determining the first angle threshold matching the current path according to an output result of the target classification model.

The second adjustment unit is configured to adjust the first angle threshold in response to the configuration instruction, to obtain the adjusted first angle threshold.

According to the embodiments provided in this disclosure, after the first angle threshold matching the current path is determined according to an output result of the target classification model, a configuration instruction generated by performing a configuration operation on an angle threshold configuration item in a configuration interface is obtained. The first angle threshold is further optimized and adjusted according to the configuration instruction, so that the adjusted first angle threshold is adapted to operating habits of the player. Therefore, different players can flexibly adjust different first angle thresholds, thereby improving the flexibility of object control.

In an exemplary solution, the apparatus can further include a second control unit, a third control unit, and/or a fourth control unit.

The second control unit is configured to control the key state of the first virtual key to be the invalid state when detecting that the long-press operation is currently performed on the first virtual key and no press operation is currently performed on the second virtual key after the adjusting key states of the first virtual key and the second virtual key to an invalid state.

The third control unit is configured to control the key state of the second virtual key to return to a valid state when detecting that no press operation is currently performed on the first virtual key and the long-press operation is currently performed on the second virtual key, the valid state being used for indicating that the key response logic of the second virtual key returns to normal.

The fourth control unit is configured to control the key states of the first virtual key and the second virtual key to return to a valid state when detecting that no press operation is currently performed on the first virtual key and the second virtual key, the valid state being used for indicating that the key response logic of the first virtual key and the second virtual key returns to normal.

According to the embodiments provided in this disclosure, after adjusting the key state of the first virtual key and the second virtual key to the invalid state, the virtual keys are controlled to execute different operation logic according to different operation manners (e.g., pressing or lifting) of the user on the virtual keys, to expand key operation functions.

Figure 13:
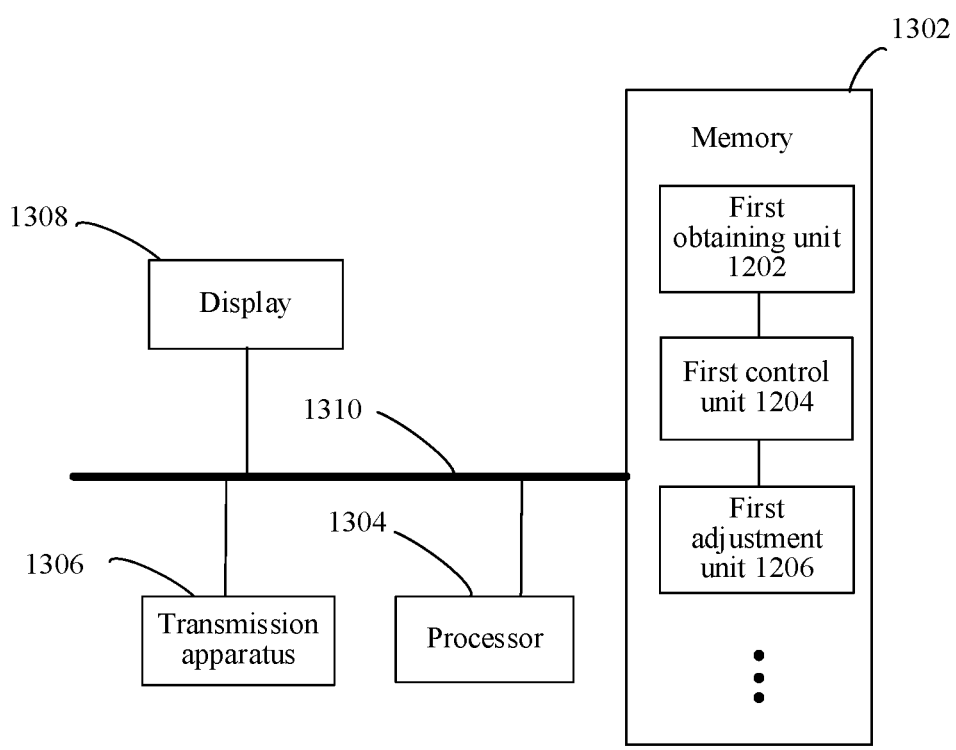
FIG. 13 is a schematic structural diagram of an exemplary electronic apparatus according to an embodiment of this disclosure.

According to yet another aspect of the embodiments of this disclosure, an electronic apparatus for implementing the foregoing object control method is further provided. As shown in FIG. 13, the electronic apparatus includes a memory 1302 and a processor 1304. The memory 1302 stores a computer program, and the processor 1304 is configured to perform the operations in any one of the above method embodiments through the computer program.

In an exemplary embodiment, the electronic apparatus may be located in at least one of a plurality of network devices in a computer network.

In an exemplary embodiment, the processor may be configured to perform the following steps through the computer program.

The processor may be configured to obtain an operation instruction generated by performing a long-press operation on a first virtual key and a second virtual key in a human-computer interaction interface displayed on a client, the first virtual key being configured to adjust an advancing direction of a target object controlled by the client, the second virtual key being configured to trigger the target object to perform a target action.

The processor may be configured to control the target object to perform the target action in a current path in response to the operation instruction, and detect a target angle generated by the target object in a process of performing the target action, the target angle being an angle between the advancing direction of the target object and a sliding direction of the target object.

Further, the processor may be configured to adjust key states of the first virtual key and the second virtual key to an invalid state when detecting that the long-press operation is currently performed on the first virtual key and the second virtual key, and the target angle reaches a first angle threshold matching the current path, to enable the target object to enter a state of passively performing the target action, the invalid state being used for indicating that key response logic of the first virtual key and the second virtual key is in a suspended state.

A person of ordinary skill in the art may understand that, the structure shown in FIG. 13 is only illustrative. The electronic apparatus may alternatively be a terminal device such as a smartphone (e.g., an Android mobile phone or an iOS mobile phone), a tablet computer, a palmtop computer, a mobile Internet device (MID), or a PAD. FIG. 13 does not limit the structure of the foregoing electronic apparatus. For example, the electronic apparatus may further include more or fewer components (e.g., a network interface) than those shown in FIG. 13, or have a configuration different from that shown in FIG. 13.

The memory 1302 may be configured to store a software program and a module, for example, a program instruction/module corresponding to the object control method and apparatus in the embodiments of this disclosure, and the processor 1304 performs various functional applications and data processing by running a software program and a module stored in the memory 1302, that is, implementing the foregoing object control method. The memory 1302 may include a high-speed random memory, and may alternatively include a non-volatile memory, for example, one or more magnetic storage apparatuses, a flash memory, or another nonvolatile solid-state memory. In some embodiments, the memory 1302 may further include memories remotely disposed relative to the processor 1304, and the remote memories may be connected to a terminal through a network. Examples of the network include, but are not limited to, the Internet, an intranet, a local area network, a mobile communication network, and a combination thereof. The memory 1302 may be specifically used for, but is not limited to, storing information such as the operation instruction, the first angle threshold, and the target angle. As an example, as shown in FIG. 13, the memory 1302 may include, but is not limited to, an extraction unit 1102, a determining unit 1104, a generation unit 1106, and a processing unit 1108 in the foregoing object control apparatus. In addition, the memory 1302 may further include, but is not limited to, other module units in the object control apparatus, which are not elaborated in this example.

In an exemplary implementation, a transmission apparatus 1306 is configured to receive or transmit data through a network. Specific examples of the network may include a wired network and a wireless network. In an example, the transmission apparatus 1306 includes a network interface controller (NIC). The NIC may be connected to another network device and a router by using a network cable, to communicate with the Internet or a local area network. In an example, the transmission apparatus 1306 is a radio frequency (RF) module, which communicates with the Internet in a wireless manner.

In addition, the foregoing electronic apparatus further includes: a display 1308, configured to display the foregoing human-computer interaction interface and a picture in which the target object performs the target action in the current path; and a connection bus 1310, configured to connect various module components in the electronic apparatus.

According to still another aspect of the embodiments of this disclosure, a storage medium is further provided. The storage medium stores a computer program, the computer program being set to perform steps in any one of the foregoing method embodiments when run. The storage medium is a non-transitory computer-readable storage medium in some embodiments.

In an exemplary embodiment, the storage medium may be set to store a computer program for performing the following steps.

The computer program may be programmed to obtain an operation instruction generated by performing a long-press operation on a first virtual key and a second virtual key in a human-computer interaction interface displayed on a client, the first virtual key being configured to adjust an advancing direction of a target object controlled by the client, the second virtual key being configured to trigger the target object to perform a target action.

The computer program may be programmed to control the target object to perform the target action in a current path in response to the operation instruction, and detect a target angle generated by the target object in a process of performing the target action, the target angle being an angle between the advancing direction of the target object and a sliding direction of the target object.

The computer program may be programmed to adjust key states of the first virtual key and the second virtual key to an invalid state when detecting that the long-press operation is currently performed on the first virtual key and the second virtual key, and the target angle reaches a first angle threshold matching the current path, to enable the target object to enter a state of passively performing the target action, the invalid state being used for indicating that key response logic of the first virtual key and the second virtual key is in a suspended state.

In an exemplary embodiment, a person of ordinary skill in the art may understand that all or some of the steps of the methods in the foregoing embodiments may be implemented by a program instructing relevant hardware of the terminal device. The program may be stored in a computer-readable storage medium (e.g., a non-transitory computer-readable storage medium), and the storage medium may include a flash disk, a read-only memory (ROM), a random access memory (RAM), a magnetic disk, an optical disc, or the like.

The sequence numbers of the foregoing embodiments of this disclosure are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this disclosure may be implemented in a form of a software product. The computer software product is stored in a storage medium and includes several instructions for instructing one or more computer devices (which may be a PC, a server, a network device or the like) to perform all or some of steps of the methods in the embodiments of this disclosure.

In the foregoing embodiments of this disclosure, the descriptions of the embodiments have respective focuses. For a part that is not described in detail in an embodiment, refer to related descriptions in other embodiments.

In the several embodiments provided in this disclosure, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this disclosure may be integrated into one processing unit, or each of the units may be physically separated, or two or more units may be integrated into one unit. The integrated unit may be implemented in the form of hardware (e.g., processing circuitry), or may be implemented in a form of a software functional unit.

The foregoing descriptions are merely exemplary implementations of this disclosure. A person of ordinary skill in the art may further make several improvements and modifications without departing from the principle of this disclo-

What is claimed is:

1. An object control method, comprising:
   detecting, by processing circuitry of a client, long-press operations on a first virtual key and a second virtual key in an interaction interface, the first virtual key being configured to adjust a movement direction of a target object in a virtual environment, the second virtual key being configured to trigger the target object to perform a drift action in the virtual environment;
   controlling the target object to perform the drift action in a current path in the virtual environment in response to the long-press operations;
   determining a target angle of the target object in a process of performing the drift action, the target angle being an angle between the movement direction of the target object and a sliding direction of the target object; and
   adjusting, by the processing circuitry of the client, key responsiveness states of the first virtual key and the second virtual key to invalid states in the interaction interface in response to a determination that the target angle of the target object in the process of performing the drift action reaches a first angle threshold matching the current path, such that the target object continues to perform the drift action in the virtual environment in a state of passive drift, the invalid states indicating that operations on the first virtual key and the second virtual key do not affect movement of the target object in the virtual environment.

2. The method according to claim 1, wherein when the key responsiveness states of the first virtual key and the second virtual key are adjusted to the invalid states, the method further comprises:
   controlling, in the interaction interface, display states of the first virtual key and the second virtual key in the invalid states to be the same as display states of the first virtual key and the second virtual key when the long-press operations are performed on the first virtual key and the second virtual key.

3. The method according to claim 1, further comprising:
   inputting path information of the current path into a target classification model, the target classification model being a model obtained after machine training is performed by using sample data and being configured to determine an angle threshold matching path information of a path, the angle threshold being an angle corresponding to a shortest duration for completing the drift action in the path; and
   determining the first angle threshold matching the current path according to an output result of the target classification model.

4. The method according to claim 3, further comprising:
   obtaining the sample data generated when performing the drift action in N sample paths, the sample data comprising an angle used when performing the drift action in an $i^{th}$ sample path of the N sample paths and a time duration for completing the drift action, i being an integer greater than or equal to 1 and less than or equal to N; and
   inputting the sample data into a pre-constructed initial classification model, and adjusting a parameter in the initial classification model according to an output result of the initial classification model, to obtain the target classification model through training.

5. The method according to claim 3, further comprising:
   receiving a configuration operation on an angle threshold configuration item in a configuration interface; and
   adjusting the first angle threshold in response to the configuration operation.

6. The method according to claim 1, further comprising:
   determining, according to frictional resistance of the current path after the target object enters the state of passive drift, a remaining time duration for the target object to complete the drift action; and
   controlling the target object to complete the drift action within the remaining time duration.

7. The method according to claim 1, further comprising:
   after the adjusting the key responsiveness states of the first virtual key and the second virtual key to invalid states, controlling the key responsiveness state of the first virtual key to be the invalid state when detecting that the long-press operation is performed on the first virtual key and no press operation is performed on the second virtual key.

8. The method according to claim 1, further comprising:
   after the adjusting the key responsiveness states of the first virtual key and the second virtual key to invalid states, controlling the key responsiveness state of the second virtual key to return to a valid state indicating that key response logic of the second virtual key returns to normal when detecting that no press operation is performed on the first virtual key and the long-press operation is performed on the second virtual key.

9. The method according to claim 1, further comprising:
   after the adjusting the key responsiveness states of the first virtual key and the second virtual key to invalid states, controlling the key responsiveness states of the first virtual key and the second virtual key to return to valid states when detecting that no press operation is performed on the first virtual key and the second virtual key, the valid states indicating that key response logic of the first virtual key and the second virtual key returns to normal.

10. The method according to claim 1, wherein
    the first virtual key is displayed in a first half of the interaction interface, and
    the second virtual key is displayed in a second half of the interaction interface.

11. An object control apparatus, comprising:
    processing circuitry configured to:
      detect long-press operations on a first virtual key and a second virtual key in an interaction interface, the first virtual key being configured to adjust a movement direction of a target object in a virtual environment, the second virtual key being configured to trigger the target object to perform a drift action in the virtual environment;
      control the target object to perform the drift action in a current path in the virtual environment in response to the long-press operations;
      determine a target angle of the target object in a process of performing the drift action, the target angle being an angle between the movement direction of the target object and a sliding direction of the target object; and
      adjust key responsiveness states of the first virtual key and the second virtual key to invalid states in the interaction interface in response to a determination that the target angle of the target object in the process of performing the drift action reaches a first angle threshold matching the current path, such that the target object continues to perform the drift action in the virtual environment in a state of passive drift, the invalid states indicating that operations on the first virtual key and the second virtual key do not affect movement of the target object in the virtual environment.

12. The apparatus according to claim 11, wherein when the key responsiveness states of the first virtual key and the second virtual key are adjusted to the invalid states, the processing circuitry is configured to:

control, in the interaction interface, display states of the first virtual key and the second virtual key in the invalid states to be the same as display states of the first virtual key and the second virtual key when the long-press operations are performed on the first virtual key and the second virtual key.

13. The apparatus according to claim 11, wherein the processing circuitry is configured to:

input path information of the current path into a target classification model, the target classification model being a model obtained after machine training is performed by using sample data and being configured to determine an angle threshold matching path information of a path, the angle threshold being an angle corresponding to a shortest duration for completing the drift action in the path; and determine the first angle threshold matching the current path according to an output result of the target classification model.

14. The apparatus according to claim 13, wherein the processing circuitry is configured to:

obtain the sample data generated when performing the drift action in N sample paths, the sample data comprising an angle used when performing the drift action in an $i^{th}$ sample path of the N sample paths and a time duration for completing the drift action, i being an integer greater than or equal to 1 and less than or equal to N; and input the sample data into a pre-constructed initial classification model, and adjust a parameter in the initial classification model according to an output result of the initial classification model, to obtain the target classification model through training.

15. The apparatus according to claim 13, wherein the processing circuitry is configured to:

receive a configuration operation on an angle threshold configuration item in a configuration interface; and adjust the first angle threshold in response to the configuration operation.

16. The apparatus according to claim 11, wherein the processing circuitry is configured to:

determine, according to frictional resistance of the current path after the target object enters the state of passive drift action, a remaining time duration for the target object to complete the drift action; and control the target object to complete the drift action within the remaining time duration.

17. The apparatus according to claim 11, wherein the processing circuitry is configured to:

after the adjusting the key responsiveness states of the first virtual key and the second virtual key to invalid states, control the key responsiveness state of the first virtual key to be the invalid state when detecting that the long-press operation is performed on the first virtual key and no press operation is performed on the second virtual key.

18. The apparatus according to claim 11, wherein the processing circuitry is configured to:

after the adjusting the key responsiveness states of the first virtual key and the second virtual key to invalid states, control the key responsiveness state of the second virtual key to return to a valid state indicating that key response logic of the second virtual key returns to normal when detecting that no press operation is performed on the first virtual key and the long-press operation is performed on the second virtual key.

19. The apparatus according to claim 11, further comprising:

after the adjusting the key responsiveness states of the first virtual key and the second virtual key to invalid states, controlling the key responsiveness states of the first virtual key and the second virtual key to return to valid states when detecting that no press operation is performed on the first virtual key and the second virtual key, the valid states indicating that key response logic of the first virtual key and the second virtual key returns to normal.

20. A non-transitory computer-readable storage medium storing instructions which when executed by a processor cause the processor to perform:

detecting long-press operations on a first virtual key and a second virtual key in an interaction interface, the first virtual key being configured to adjust a movement direction of a target object in a virtual environment, the second virtual key being configured to trigger the target object to perform a drift action in the virtual environment;

controlling the target object to perform the drift action in a current path in the virtual environment in response to the long-press operations;

determining a target angle generated by the target object in a process of performing the drift action, the target angle being an angle between the movement direction of the target object and a sliding direction of the target object; and adjusting key responsiveness states of the first virtual key and the second virtual key to invalid states in the interaction interface in response to a determination that the target angle of the target object in the process of performing the drift action reaches a first angle threshold matching the current path, such that the target object continues to perform the drift action in the virtual environment in a state of passive drift, the invalid states indicating that operations on the first virtual key and the second virtual key do not affect movement of the target object in the virtual environment.

* * * * *